Figures 1, 2:
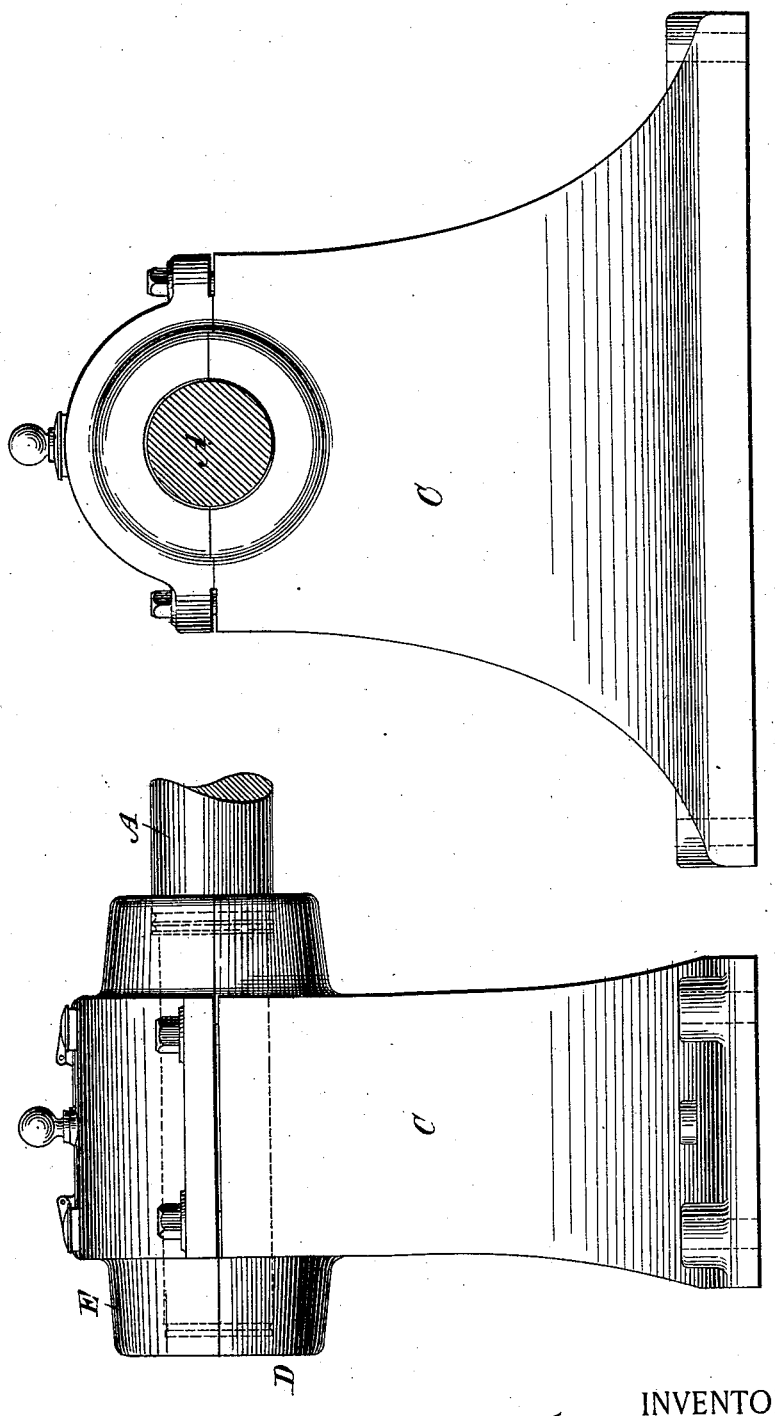

(No Model.) 3 Sheets—Sheet 1.

J. J. WOOD.
JOURNAL BEARING.

No. 513,696. Patented Jan. 30, 1894.

WITNESSES:
Fred White
C. K. Fraser

INVENTOR:
James J. Wood,
By his Attorneys,
Arthur C. Fraser & Co.

(No Model.)

J. J. WOOD.
JOURNAL BEARING.

No. 513,696.

3 Sheets—Sheet 2.

Patented Jan. 30, 1894.

WITNESSES:
Fred White
C. K. Fraser.

INVENTOR:
James J. Wood,
By his Attorneys,
Arthur C. Fraser & Co.

(No Model.) 3 Sheets—Sheet 3.

J. J. WOOD.
JOURNAL BEARING.

No. 513,696. Patented Jan. 30, 1894.

WITNESSES:
Fred White
C. K. Fraser.

INVENTOR:
James J. Wood,
By his Attorneys,
Arthur C. Fraser & Co.

UNITED STATES PATENT OFFICE.

JAMES J. WOOD, OF FORT WAYNE, INDIANA.

JOURNAL-BEARING.

SPECIFICATION forming part of Letters Patent No. 513,696, dated January 30, 1894.

Application filed June 7, 1893. Serial No. 476,855. (No model.)

*To all whom it may concern:*

Be it known that I, JAMES J. WOOD, a citizen of the United States, residing in Fort Wayne, in the county of Allen and State of Indiana, have invented certain new and useful Improvements in Journal-Bearings, of which the following is a specification.

This invention provides an improved construction of journal bearing designed particularly for the shafts of machinery turning at high speed, being especially adapted for the shafts of dynamo electric machines.

My improved journal bearing is a self-oiling expansible bearing. So long as it is kept supplied with oil it acts to keep the journal thoroughly lubricated, and in case through negligence it should run dry and should consequently heat, the bearing sleeve or bushing in which the journal turns is so mounted that it may freely expand by the heat so that the shaft cannot bind fast.

In my Patent No. 421,089, dated February 11, 1890, is illustrated an expansion bearing wherein an expansible bushing of elastic metal is interposed between the bearing sleeve and the outer supporting frame or casing of the bearing, in order that in case of heating the bearing sleeve may expand or increase in diameter, the yielding bushing being thereby distorted or forced out of its normal form. The yielding bushing is constructed as a ring or sleeve having seats at intervals on its exterior resting against seats formed in the supporting frame or casing, and having seats on its interior out of coincidence with the exterior seats and supporting the inner sleeve. By the expansion of the inner sleeve the expansible bushing is distorted by the outward displacement of its interior seats relative to its exterior seats, which are immovably supported.

My present invention simplifies the construction shown in that patent by wholly dispensing with the interposed expansible bushing. According to my present invention I substitute for this expansible bushing, a construction of the supporting frame whereby one or more yielding seats are provided by which the bearing sleeve is supported, these yielding seats being in the form of one or more ribs or arms cast preferably integrally with the supporting frame or shell, and arranged to extend laterally so as to transmit the thrust in such oblique manner as to be capable of flexure in case of the forced expansion of the sleeve by heating. The seats are preferably formed as Y-shaped ribs cast integrally within the inclosing shell or oil chamber of the bearing, and by preference two such Y-shaped ribs are employed.

Figure 4:
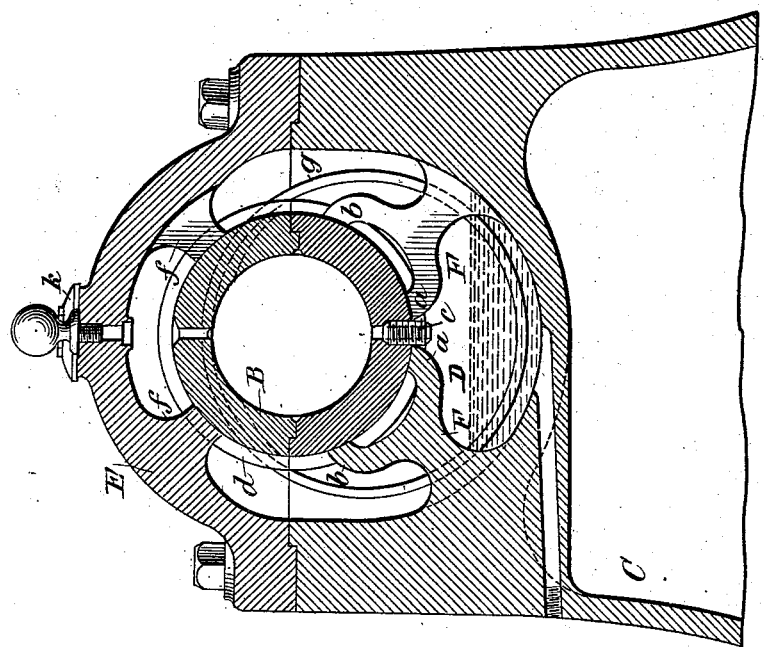
Figure 3:
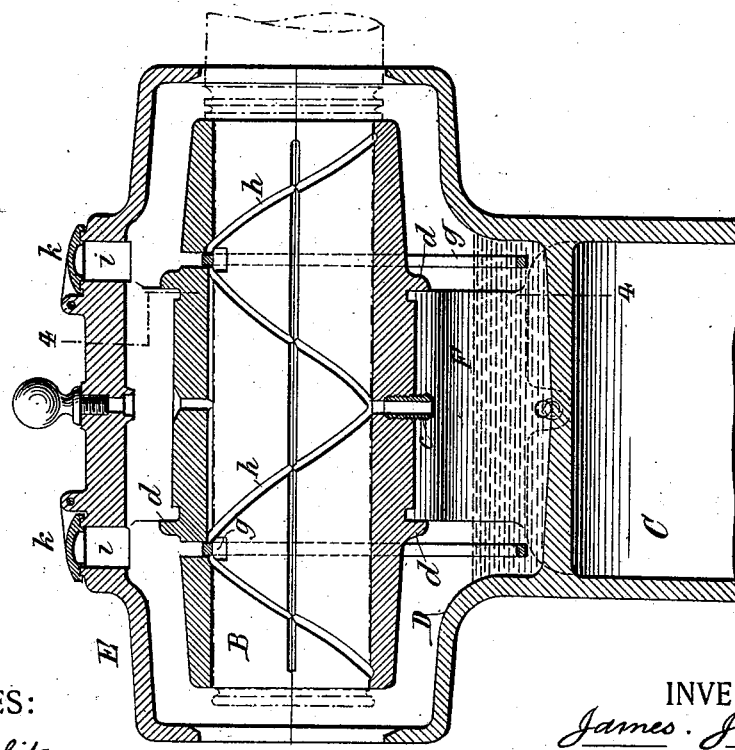
Figure 5:
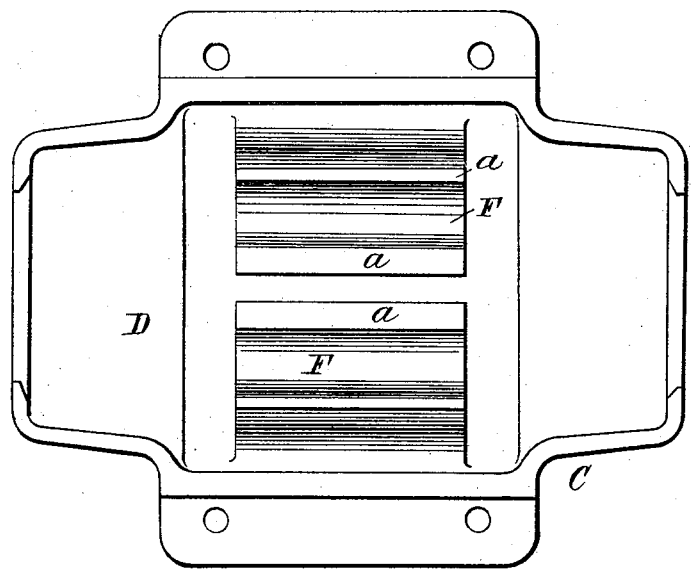
Figure 6:
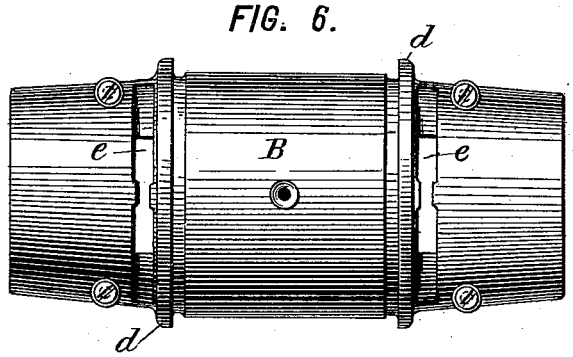
Figure 7:
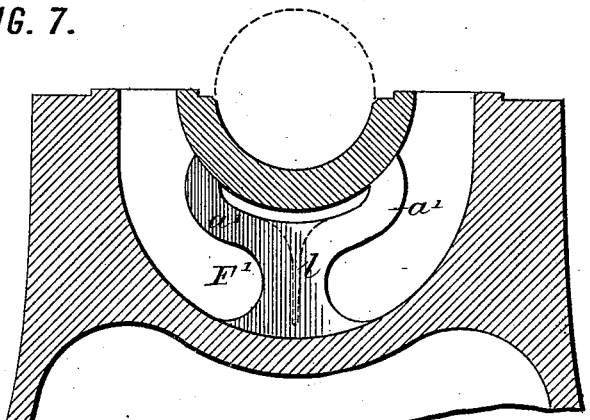

Figure 1 of the accompanying drawings is a side elevation of a bearing pillar embodying my invention, and Fig. 2 is an end elevation thereof showing the shaft in section. Fig. 3 is a longitudinal mid-section of the bearing the shaft being removed. Fig. 4 is a transverse section thereof, the left-hand half of the figure being a mid-section, and the right-hand half being partly a section in the plane of the line 4—4 in Fig. 3. Fig. 5 is a plan of the supporting frame or lower half of the bearing shell with the other parts removed. Fig. 6 is a plan of the bearing sleeve removed. Fig. 7 is a transverse section similar to Fig. 4 showing a modified construction of the lower half of the shell of the bearing.

Let A designate the shaft, shown in Figs. 1 and 2, and in dotted lines in Fig. 3.

Let B designate the bearing sleeve or bushing in which the shaft turns; and let C designate the supporting frame of the bearing, which may be a pillar or a pillow-block, or any other suitable construction for supporting the bearing, its construction depending of course upon the location of the bearing and the construction of machine to which it is to be applied. The supporting frame C has formed at its upper part an inclosing shell or oil chamber D, the upper half of which is formed by a bearing cap E which is bolted down to the supporting frame C. The shell or chamber D is preferably prolonged at opposite ends in the form of hubs surrounding the shaft so as to make room for a suitably elongated bearing sleeve B, as clearly shown in Fig. 3. The bearing sleeve B is supported within the shell or oil chamber D by means of one or more yielding seats F F constructed preferably as ribs or arms cast integrally with the supporting frame C, and so shaped or bent as to receive the thrust due to the supporting of the sleeve B in a direction more or less transverse to, or oblique to, the direction of their length, in order that they may yield slightly in transmitting this thrust to the supporting frame. By preference two such yielding seats are provided, as shown in Fig. 4, and the seats are formed as ribs having two branches or arms spreading or curving to opposite sides of the main or undivided portion of the rib which joins the supporting frame. The ribs are consequently approximately Y-shaped in transverse section, being preferably so curved that the strain of supporting the sleeve is transmitted transversely of the bifurcated arms or portions of the ribs and tends to flex them. I prefer to form the supporting frame of cast iron with the ribs F F cast integrally with it, as this affords a simple and cheap construction, and cast iron possesses ample elasticity for the purpose. The preferred construction and arrangement is that shown in Figs. 3 and 4, where the two Y-shaped ribs F F spring from diagonally opposite portions of the interior of the shell D, and then spread each into two widely separated arms, the inner ones $a$ $a$ of which approach each other so closely as to come almost together beneath the under side of the sleeve, while the outer arms $b$ $b$ ascend to somewhat less than the middle of the sleeve. The inner arms $a$ $a$ approach each other so closely as to leave only room between them for an oil-drip-tube $c$, which projects downwardly from the middle of the sleeve, and so that it serves also the purpose of a key to prevent any rotative displacement of the sleeve in the bearing shell. The bearing cap E has inwardly projecting ribs or flanges $f$ $f$ which come against the upper portion of the bearing sleeve and hold the latter closely embraced between these ribs and the yielding ribs or seats F F beneath. The ribs $f$ $f$ on the bearing cap might also be made yielding, being counterparts of the seats F, F, but this is not deemed necessary. The ribs F F and $f$ $f$ extend for only a part of the length of the sleeve B, being preferably only about one-third as long as the sleeve, as shown in Fig. 3, and their ends all terminate in the same parallel vertical planes. The sleeve B is formed with two opposite circumferential flanges $d$ $d$ which project beyond and come close against the ends of the ribs F F, $f$ $f$, whereby the sleeve is kept from longitudinal displacement. In the construction shown I have found it advisable to divide the sleeve B horizontally into two sections, in order that by removing the bearing cap E and the upper half of the sleeve, the shaft may be lifted vertically out of the bearing. This construction, however, is not essential to my invention, since the sleeve may be made in one piece as in my said previous patent.

For efficiently lubricating the journal I provide the same means of lubrication as is shown in my Patent No. 493,742, dated March 21, 1893. The bearing sleeve B is formed just outside of the flanges $d$ $d$ (see Fig. 6) with slots $e$ $e$ which cut nearly through its upper half and thereby expose the shaft of the journal through these slots. Into these slots are dropped two oiling rings $g$ $g$ which consequently rest on the journal and are caused to travel around by reason of the rotation of the journal. The lower portions of these rings are immersed in a bath of lubricating oil held in the lower part of the shell D, so that as they revolve they carry this oil up and apply it to the shaft. For effectually distributing it over the shaft, the inner face of the bearing shell D is formed with spiral oil grooves $h$ $h$. For conveniently introducing oil to the bearing, the cap E is formed with openings $i$ $i$ closed by tight fitting doors $k$ $k$. These lubricating devices form no necessary part of my present invention, and may be greatly varied without departing therefrom.

Fig. 7 shows a modified construction wherein only one yielding seat F (here lettered F') is shown. This seat is arranged centrally beneath the bearing sleeve, and has its two arms $a'$ $a'$ extended to right and left, and terminating in the seating faces for the sleeve, meeting it at about ninety degrees apart.

Many other constructions of the yielding bearings or ribs might be substituted, without departing from the essential features of my invention. For example, the single rib shown in Fig. 7 might be subdivided as shown by the dotted lines $l$ into two separate ribs, or curved arms, whereby a greater degree of elasticity would be afforded.

I claim as my invention the following-defined novel features or improvements, substantially as hereinbefore specified, namely:

1. In a journal bearing, the combination with the bearing sleeve, of a supporting frame formed with a shell or chamber inclosing said sleeve and constructed with intervening yielding seats for supporting it, consisting of laterally projecting arms of cast metal adapted to permit of the expansion of the sleeve.

2. In a journal bearing, the combination with the bearing sleeve of a supporting frame formed with a shell or chamber of cast metal inclosing said sleeve and constructed with integral yielding seats for supporting it, consisting of ribs formed as laterally projecting arms adapted to permit of the expansion of the sleeve.

3. In a journal bearing, the combination with the bearing sleeve of a supporting frame formed with a shell or chamber inclosing said sleeve and constructed with a yielding rib having arms of Y form for supporting said sleeve.

4. In a journal bearing, the combination with the bearing sleeve of a supporting frame formed with a shell or chamber inclosing said sleeve and constructed with two yielding ribs formed as lateral arms for supporting said sleeve on opposite sides of the middle.

5. In a journal bearing, the combination with the bearing sleeve of a supporting frame formed with a shell or chamber inclosing said sleeve and constructed with two yielding ribs having arms of Y form for supporting said sleeve on opposite sides of the middle.

6. In a journal bearing, the combination with the bearing sleeve of a supporting frame formed with a shell or chamber inclosing said sleeve, and constructed with two yielding ribs for supporting said sleeve, said ribs approaching each other beneath the bottom of said sleeve, and a drip-tube $c$ fastened into the bottom of said sleeve and confined between said ribs, whereby it serves to prevent rotative displacement of the sleeve.

7. In a journal bearing, the combination with a bearing sleeve having circumferential flanges on opposite sides of its middle, of a supporting frame formed with yielding ribs for supporting said sleeve, shorter than the sleeve and confined between the flanges on the sleeve, whereby the longitudinal displacement of the sleeve is prevented.

8. In a journal bearing, the combination with a bearing sleeve having circumferential flanges on opposite sides of its middle, of a supporting frame formed with yielding ribs for supporting said sleeve, and a bearing cap formed with internal ribs bearing against said sleeve, the said ribs on the supporting frame and bearing cap being shorter than the sleeve and confined between the flanges on the sleeve.

In witness whereof I have hereunto signed my name in the presence of two subscribing witnesses.

JAMES J. WOOD.

Witnesses:
CHAS. C. MILLER,
R. F. HARDING.